(12) United States Patent
Cho et al.

(10) Patent No.: US 8,300,221 B2
(45) Date of Patent: Oct. 30, 2012

(54) MINUTE MEASURING INSTRUMENT FOR HIGH SPEED AND LARGE AREA AND METHOD THEREOF

(75) Inventors: Yong Jai Cho, Daejeon (KR); Won Chegal, Daejeon (KR); Hyun Mo Cho, Daejeon (KR)

(73) Assignee: Korea Research Institute of Standards and Science (KR)

( * ) Notice: Subject to any disclaimer, the term of this patent is extended or adjusted under 35 U.S.C. 154(b) by 277 days.

(21) Appl. No.: 12/666,064

(22) PCT Filed: Nov. 11, 2008

(86) PCT No.: PCT/KR2008/006641
§ 371 (c)(1),
(2), (4) Date: Dec. 22, 2009

(87) PCT Pub. No.: WO2009/064103
PCT Pub. Date: May 22, 2009

(65) Prior Publication Data
US 2010/0321693 A1    Dec. 23, 2010

(30) Foreign Application Priority Data
Nov. 14, 2007  (KR) .................. 10-2007-0116340

(51) Int. Cl.
*G01J 4/00* (2006.01)
(52) U.S. Cl. .................. 356/369; 356/365; 356/445

(58) Field of Classification Search .......... 356/366–369, 356/445; 250/216, 234, 227.11, 306, 307
See application file for complete search history.

(56) References Cited

U.S. PATENT DOCUMENTS

| | | | | |
|---|---|---|---|---|
| 5,578,745 | A * | 11/1996 | Bayer et al. .................... | 73/1.73 |
| 5,939,709 | A * | 8/1999 | Ghislain et al. ............... | 250/216 |
| 5,963,326 | A | 10/1999 | Masao | |
| 6,006,593 | A * | 12/1999 | Yamanaka ...................... | 73/105 |
| 6,880,386 | B1 * | 4/2005 | Krotil et al. .................... | 73/105 |
| 6,934,024 | B2 * | 8/2005 | Zhan et al. ..................... | 356/369 |
| 6,990,835 | B2 * | 1/2006 | Schroeder et al. ............. | 65/106 |
| 7,278,296 | B2 * | 10/2007 | Kitamura ........................ | 73/105 |
| 7,617,719 | B2 * | 11/2009 | Su et al. .......................... | 73/105 |
| 2007/0216412 | A1 * | 9/2007 | Tsuji et al. ..................... | 324/318 |

FOREIGN PATENT DOCUMENTS

| | | |
|---|---|---|
| JP | 1993-059539 | 2/1993 |
| KR | 10-0742982 | 7/2007 |

OTHER PUBLICATIONS

International Search Report for PCT/KR2008/006641 dated Dec. 22, 2008.

\* cited by examiner

*Primary Examiner* — Sang Nguyen
(74) *Attorney, Agent, or Firm* — Cantor Colburn LLP

(57) ABSTRACT

The present invention relates to a minute measuring instrument for high speed and large area and a method thereof, and more particularly, to a minute measuring instrument for high speed and large area which measures properties of a specimen in high speed by a focused-beam ellipsometric part and then minutely remeasures the position showing a singular point by a minute measuring part and a method thereof.

9 Claims, 6 Drawing Sheets

MINUTE MEASURING INSTRUMENT FOR HIGH SPEED AND LARGE AREA AND METHOD THEREOF

TECHNICAL FIELD

The present invention relates to a minute measuring instrument for high speed and large area and a method thereof, and more particularly, to a minute measuring instrument for high speed and large area which measures properties of a specimen in high speed by a focused-beam ellipsometric part and then minutely measures the position showing a singular point by a minute measuring part and a method thereof.

BACKGROUND ART

In general, in studies in the fields of physics, chemistry and material, it is very important to measure optical properties of a material and measure a thickness of a thin film. Particularly, a variety of nano-thin film manufacturing processes is used in semiconductor industries, and an ellipsometer which is non-destructive and contactless real-time measuring equipment is widely used as a measuring equipment to evaluate physical properties of the manufactured thin films.

A variety of methods is currently known as a principle of measuring optical properties of a material and a thickness of a thin film. An ellipsometry has largely increased applications as its performance is much improved with development of a light source, a photodetector and a computer and processes using a thin film and a surface are increased. Also, a Scanning Probe Microscope (hereinafter, referred to as "SPM") is an instrument capable of measuring the surface of the material at an atomic level and used in wide application fields.

The ellipsometry can be divided into a reflection type and a transmission type and the widely used is the reflection type ellipsometry which analyzes a polarization state of a light reflected from a surface of a specimen with an angle of incidence. By measuring variation in the polarization state of the light reflected by the specimen, it may be used mainly to extract the optical properties of the specimen such as a refractive index or an extinction coefficient and may be used to extract properties such as interfacial state of the specimen as well.

In the case of focusing on the surface of the specimen in a dot shape using an optical system, a plurality of the specimens cannot be measured at the same time and thus it takes much time since the thickness or properties of the specimen has to be measured one after another.

Also, in the case of measuring the optical properties of the specimen with an ellipsometer, it is difficult to measure the very minute optical properties of the specimen since its horizontal resolution is low. In this case, it is possible to measure the minute optical properties of the specimen using a microscope having excellent vertical and horizontal resolutions such as a SPM, but it takes much time to measure the minute optical properties of the specimen since the ellipsometer and the SPM are constructed as separate instruments. In other words, it is possible to find a singular point using the ellipsometer, but a large area has to be minutely measured again, as it is difficult to know the exact position of the singular point when measuring using the SPM after the measurement of the ellipsometer, and the SPM constructed as a separate instrument has to be provided. Therefore, it takes much time and efforts.

DISCLOSURE

[Technical Problem]

It is an object of the present invention to provide a minute measuring instrument for high speed and large area, for quickly and minutely measuring optical singular point of a specimen by measuring properties of a specimen in high speed by a focused-beam ellipsometric part and then minutely measuring the position showing a singular point by a minute measuring part and a method thereof.

It is another object of the present invention to provide an instrument which focuses a light onto the specimen using a convex lens as well as an instrument which focuses a light onto the specimen using a cylindrical optical system in order to measure the optical properties of the specimen in high speed.

[Technical Solution]

A minute measuring instrument for high speed and large area includes a focused-beam ellipsometric part for measuring optical properties of a specimen in high speed by focusing a polarized light onto the specimen and detecting the light reflected from the specimen; and a minute measuring part for measuring again the position, at which a singular point of the optical properties of the specimen is expressed, at an atom level.

The focused-beam ellipsometric part includes a beam splitting part for a light generated in the light source into the polarized light; a focusing part for focusing the light split by the beam splitting part onto the specimen; and a photodetection part for detecting the light passed through the focusing part and the beam splitting part after reflected from the specimen.

The focusing part includes a convex lens for focusing the light split by the beam splitting part onto the specimen.

The focusing part includes a cylindrical optical system for linearly focusing the light split by the beam splitting part onto the specimen.

The cylindrical optical system includes at least one of a semi-cylindrical lens, a semi-cylindrical mirror and a curved mirror.

The minute measuring part includes a Scanning Probe Microscope.

The Scanning Probe Microscope measures irregularity in nano-patterns of the specimen or the position of an impurity included in the specimen.

A minute measuring method for high speed and large area includes measuring optical properties of a specimen in high speed by focusing a polarized light onto the specimen and detecting the light reflected from the specimen; removing the light source; and measuring again the position, at which a singular point of the optical properties of the specimen is expressed, at an atom level using a Scanning Probe Microscope.

The method may further include storing the position, at which the singular point is expressed, in a computer.

The measuring at an atomic level includes moving a cantilever to the position of the singular point using an XY-translator that moves horizontally; and remeasuring the optical properties of the specimen using an XY-scanner and Z-scanner of the Scanning Probe Microscope.

DETAILED DESCRIPTION OF MAIN ELEMENTS

Figure 1:
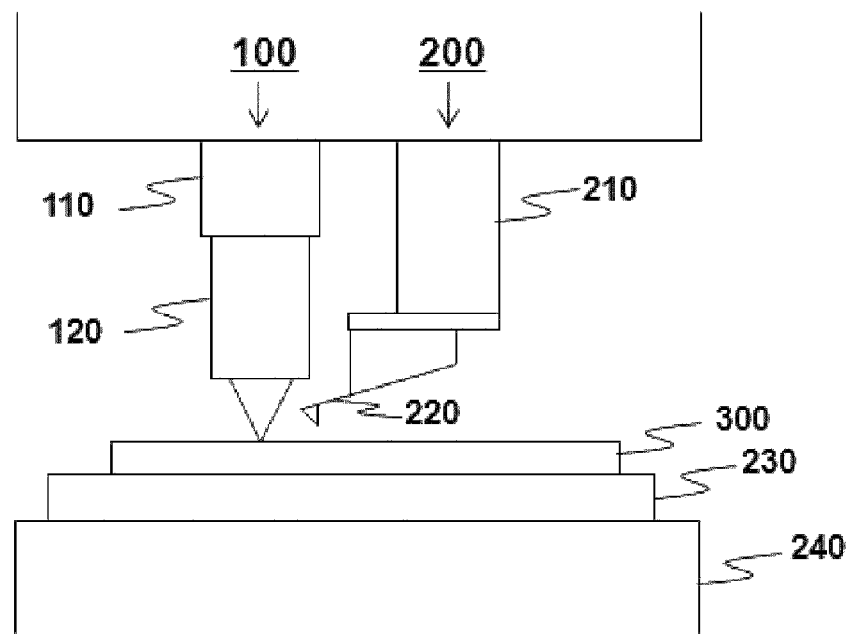
FIG. 1 is a structural view illustrating a minute measuring instrument for high speed and large area according to an embodiment of the present invention.

100: focused-beam ellipsometric part
110: Z-translator
120: ellipsometer
200: minute measuring part
210: Z-scanner
220: cantilever
230: XY-scanner
240: XY-translator

[Best Mode]

All technical and scientific terms used herein have the same meaning as commonly understood by a person having ordinary skill in the art to which this invention belongs. However, several of the terms may not be generally understood, and general definitions of these terms are provided herein. While it is not intended that the present invention would be restricted by shortcomings in these definitions, it is believed to be helpful to provide these definitions as guidance to those unfamiliar with the terms.

Herein after, preferred embodiments of the present invention will be described in detail with reference to accompanying drawings.

FIG. 1 is a structural view illustrating a minute measuring instrument for high speed and large area according to an embodiment of the present invention. Referring to FIG. 1, minute measuring instrument for high speed and large area includes a focused-beam ellipsometric part 100 and a minute measuring part 200.

The focused-beam ellipsometric part 100 includes a Z-translator 110 and an ellipsometer 120, and the minute measuring part 200 includes a Z-scanner 210, a cantilever 220, a XY-scanner 230 and a XY-translator 240. The Z-translator 110 moves the ellipsometer 120 up and down so that a light outputted from the ellipsometer 120 is focused onto a specimen 300.

The Z-translator 110 may be made in various shapes and structures to perform the aforementioned function, and the shape and structure of the Z-translator 110 do not restrict the present invention.

The ellipsometer 120 measures the properties of the specimen by making a polarized light to be incident to the specimen and then measuring the light reflected from the specimen 300. The ellipsometer 120 will be described in later with reference to FIGS. 2 and 3.

The focused-beam ellipsometric part 100 measures the optical properties of the specimen 300 quickly and broadly. At this time, the XY-translator 240 may be used. For example, the focused-beam ellipsometric part 100 has a vertical resolution of 0.1 nm, a horizontal resolution of 1 μm and a moving speed of 400 mm/s.

After that, when a singular point is found from the measured optical properties, the minute measuring part 200 measures around the singular point more minutely. The minute measuring part 200 may consist of a SPM. In the case of employing the SPM, the minute measuring part 200 has a vertical resolution of 0.05 nm, a horizontal resolution of 0.15 nm, a measuring time of about 30,000 steps/sec and a measuring area of 5 μm×5 μm.

When the measurement of the focused-beam ellipsometer 100 is completed, the light source is cut off and the cantilever 220 is brought to the vicinity of the singular point by moving the specimen 300 using the XY-translator 240. After that, the Z-scanner 210 and/or the XY-scanner 230 minutely measure around the singular point. Therefore, it is possible to minutely measure the singular point more quickly than the measurement using the SPM alone. Locations and structures of the Z-scanner 210 and the XYscanner 230 do not restrict the present invention.

Examples of the SPM usable for the present invention may include a Scanning Tunneling Microscope (STM), an Atomic Force Microscope (AFM), a Force Modulation Microscope (FMM), a Phase Detection Microscope (PDM), a Magnetic Force Microscope (MFM), an Electrostatic Force Microscope (EFM) and a Scanning Capacitance Microscope (SCM). The principle of the SPM is well known to those skilled in the art and thus is not described in detail herein. The concepts of the respective SPMs are as follows.

The STM measures the properties of the specimen using quantum tunneling, in which when a cantilever is brought near to a conductive surface of the specimen with a gap of one or two atoms, applying of suitable voltage across both ends of the gap causes electrons to perforate through the energy wall, thereby current flowing.

The AFM measures the properties of the specimen using a phenomenon in that when a probe, so called as a cantilever is brought near to a conductive surface of the specimen with a gap of one or two atoms, attractive force and repulsive force act between the atom of the tip of the cantilever and the atom on the surface of the specimen depending on the distance therebetween.

The FMM measures the properties of the specimen using a phenomenon in that when vibrating a cantilever with a fixed amplitude in a range in which the cantilever is in contact with the specimen, the amplitude and phase of the cantilever is changed by the contact with the specimen.

The MFM measures the magnetic properties of the specimen using a cantilever coated with magnetic substances.

The EFM measures the electrical properties of the specimen using electrostatic force generated by applying AC voltage and DC voltage between the cantilever and the specimen.

The SCM measures the properties of the specimen by connecting a capacitance sensor to the cantilever and measuring a capacitance between the cantilever and the specimen.

The minute measuring part 200 includes one of the aforementioned SPMs and may include other kinds of SPMs which would be developed later.

Figure 2:
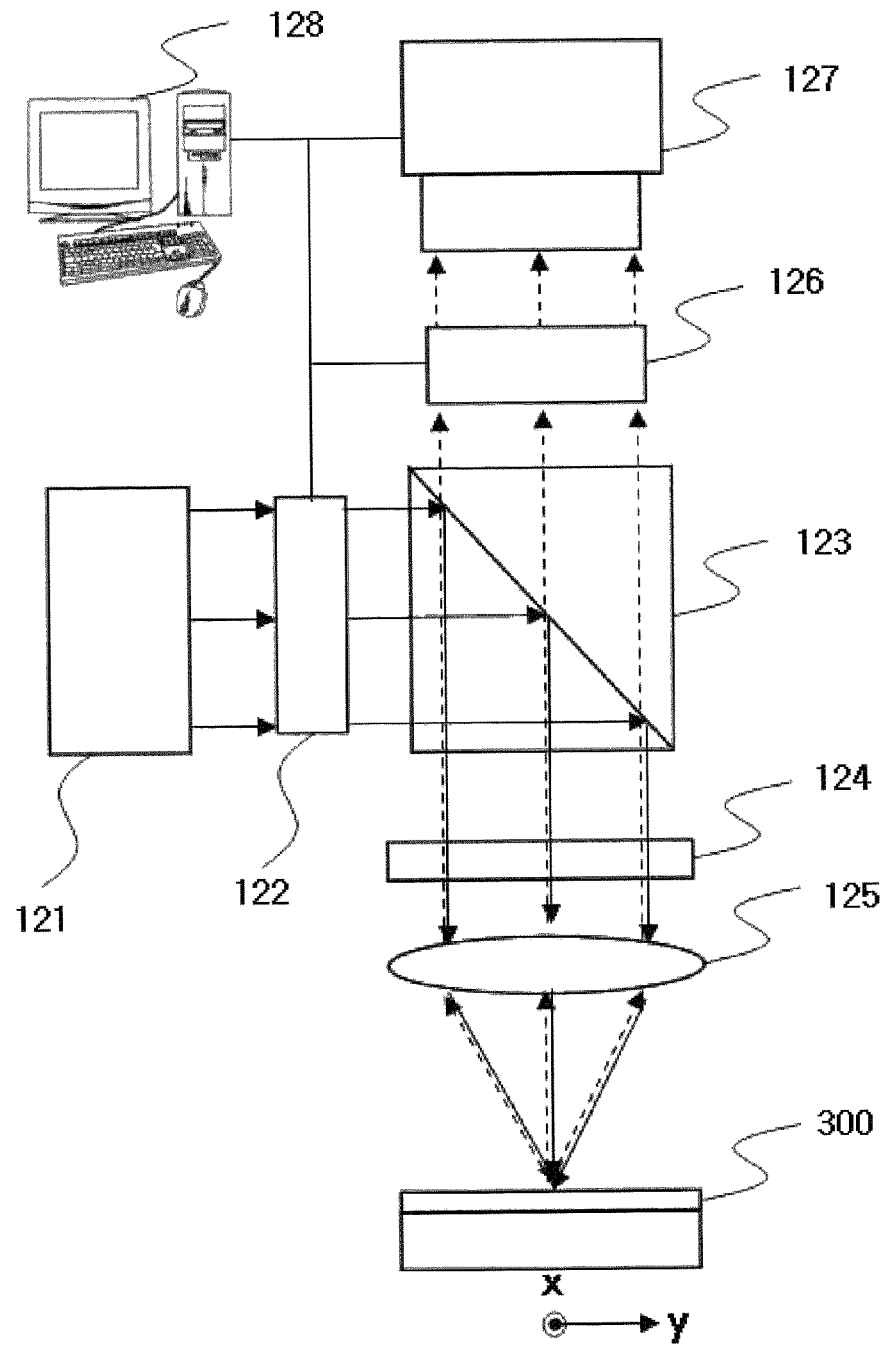
FIG. 2 is a structural view illustrating a focused-beam ellipsometric part according to an embodiment of the present invention.

FIG. 2 is a structural view illustrating a focused-beam ellipsometric part according to an embodiment of the present invention. Referring to FIG. 2, the ellipsometer includes a light source part 121, a polarization generation part 122, a beam splitting part 123, an aperture plate 124, a focusing part 125, a polarization detection part 126, a photodetection part 127 and a central processing unit 128.

The polarization generation part 122 makes a collimating light emitted from the light source part 121 into a specific polarization state. The beam splitting part 121 splits some of the light passed through the polarization generation part 122. The split light passes through the focusing part 125 placed below the beam splitting part 123. The focusing part 125 refracts the split light and linearly focuses the split light onto the specimen 300.

Optionally, the light split by the beam splitting part 123 may pass through the aperture plate 124 before passes through the focusing part 125. The aperture plate 124 blocks the periphery of the light and allows the center of the light to arrive at the focusing part 125. Structures of the aperture plate 124 and the focusing part 125 will be described later.

The light reflected from the specimen 300 passes through the polarization detection part 126 for filtering a specific polarization state after passing through the focusing part 125 and the beam splitting part 123. After that, the light passed through the polarization detection part 126 is inputted into the photodetection part 127, and the photodetection part 127 measures the intensity of the inputted light. The photodetection part 127 consists of pixels, and information obtained by the pixels is transferred to the central processing unit 128 and stored as a digital signal.

Figure 3:
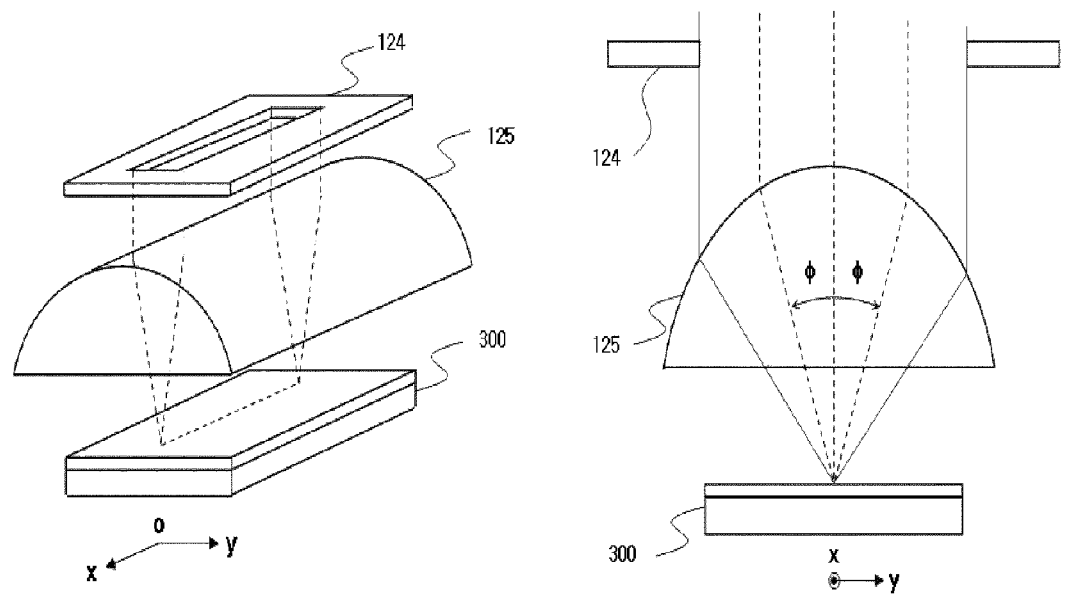
FIG. 3 is a structural view illustrating a cylindrical optical system according to an embodiment of the present invention.

FIG. 3 is a structural view illustrating a cylindrical optical system according to an embodiment of the present invention. The focusing part 125 may consist of a convex lens as shown in FIG. 2. In this case, the light outputted from the beam splitting part 123 is focused on to the specimen 300 through the focusing part 125.

Also, the focusing part 125 may consist of a cylindrical optical system as shown in FIG. 3. Referring to FIG. 3, the left is a perspective view of the focusing part 125 and the right is a front view of the focusing part 125 when viewed in an X-axis. The light split by the beam splitting part 123 passes through the aperture plate 124.

The aperture plate 124 has a rectangular shape formed with a rectangular hole at the center thereof, and some of the light split by the beam splitting part 123 is transferred to the focusing part 125 through the rectangular hole and the rest of the light is blocked by the aperture plate 124. As aforementioned, the aperture plate 124 is optional and the light split by the beam splitting part 123 may be directly transferred to the focusing part 125 without passing through the aperture plate 124. The rectangular hole at the center of the aperture plate 124 is only illustrative, and the aperture plate 124 of the present invention may have a hole of various shapes.

As shown in FIG. 3, the focusing part 125 may be made up of a semi-cylindrical lens and the semi-cylindrical lens has an aperture plate-side surface which is a curved surface having a semicircular cross-section and a specimen-side surface which is a rectangular plane. Therefore, the light transferred to the semi-cylindrical lens is refracted while passing through the semi-cylindrical lens and then linearly converged into the specimen 300. The light passed through the semi-cylindrical lens is reflected from the specimen 300 with the same angle Φ of reflection as the angle Φ of incidence, and then refracted while passing through the semi-cylindrical lens and transferred to the aperture plate 124.

The structure of the focusing part 125 described above is illustrative, and any focusing part 125 can be employed, provided that it linearly focuses the light onto the specimen 300.

Figure 4:
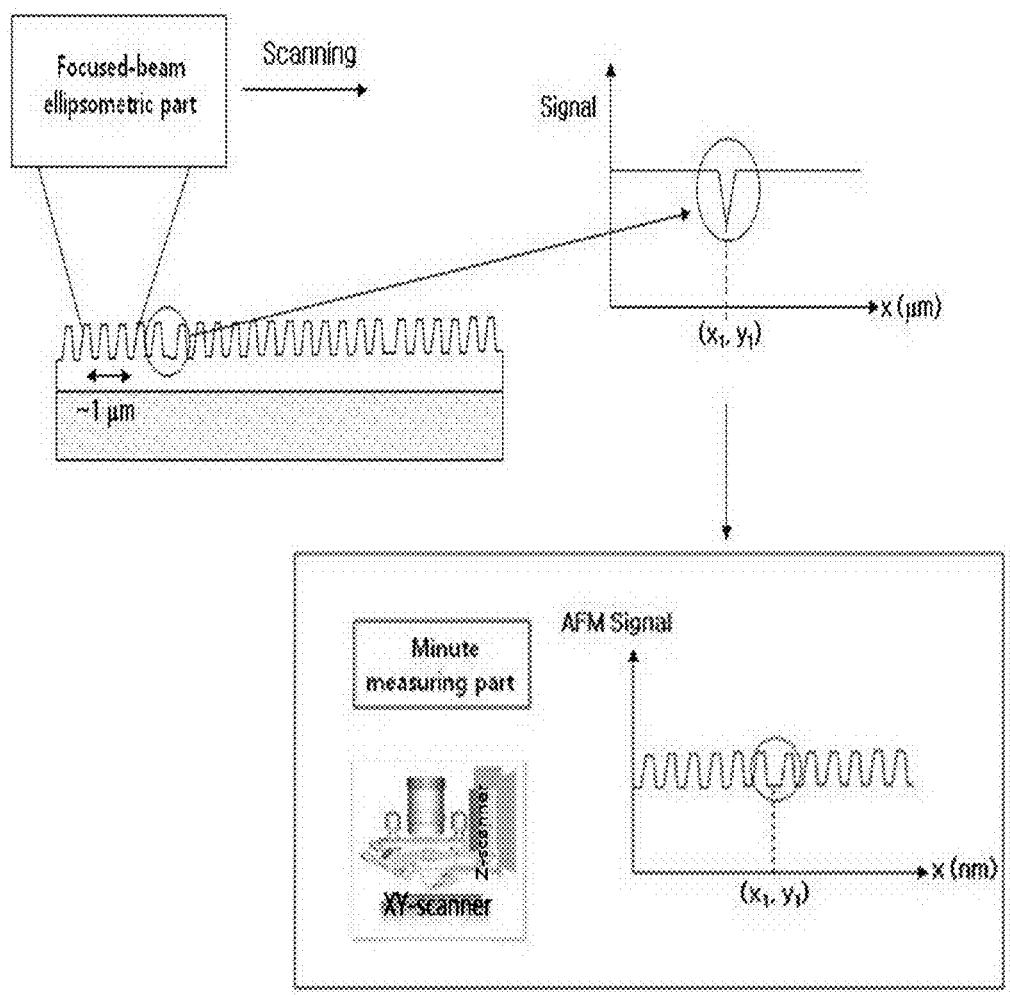
FIG. 4 is a view illustrating a method of measuring an irregularity of a specimen according to an embodiment of the present invention.
Figure 5:
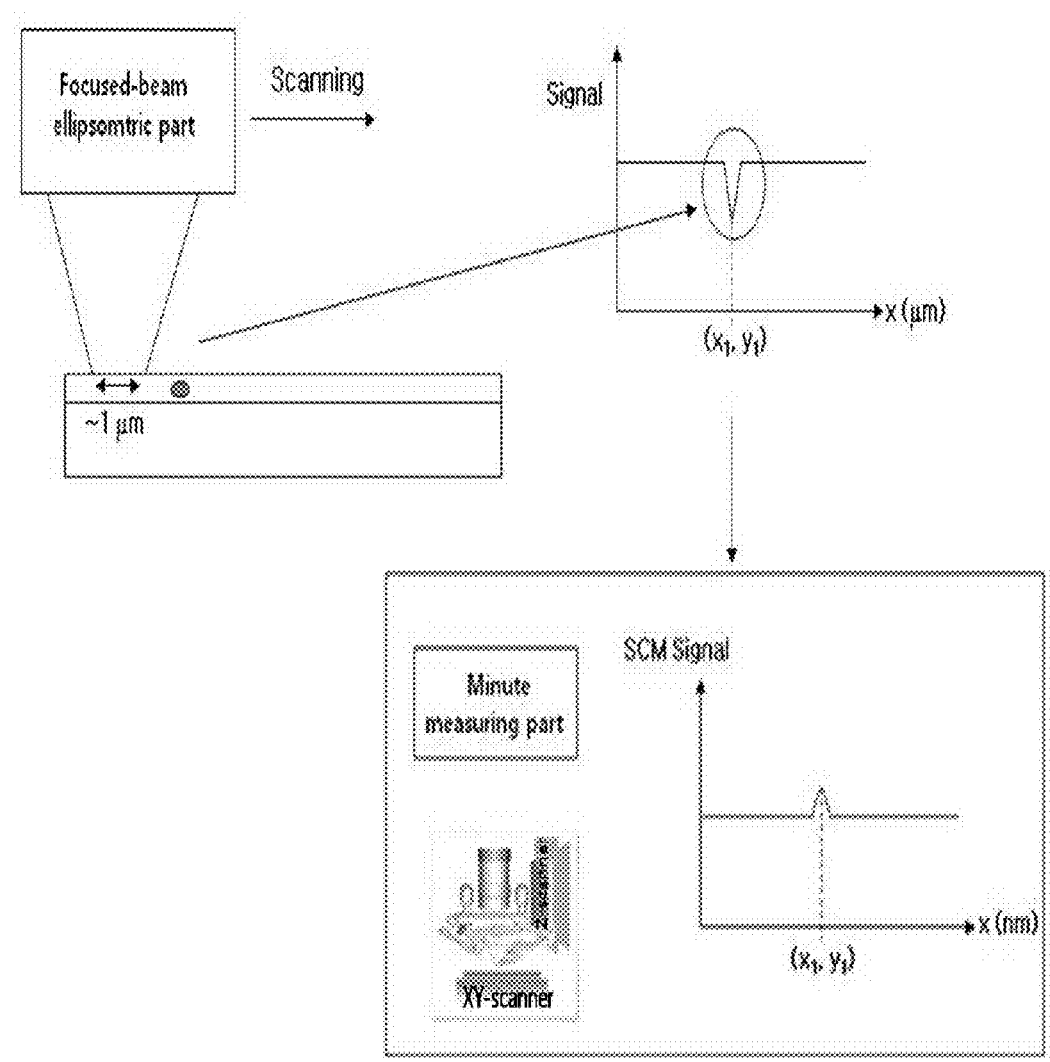
FIG. 5 is a view illustrating a method of measuring a location of an impurity on the specimen according to an embodiment of the present invention.

FIGS. 4 and 5 are views illustrating methods of measuring an irregularity of a specimen and a location of an impurity on the specimen, respectively, according to an embodiment of the present invention. Referring to FIG. 4, at first, the focused-beam ellipsometric part scans the specimen in high speed. If a singular point is found on the surface of the specimen, information for the location of the singular point (coordinate (x1, y1) in FIG. 4) is stored. Next, the minute measuring part measures around the singular point minutely. While the irregularity of the specimen is measured using an AFM in FIG. 4, it is possible to measure the irregularity of the specimen using another kind of the SPM.

Referring to FIG. 5, at first, the focused-beam ellipsometric part scans the specimen in high speed. If a singular point including an impurity is found on the surface of the specimen, information for the location of the singular point (coordinate (x1, y1) in FIG. 5) is stored. Next, the minute measuring part measures around the singular point minutely. While the location of impurity included in the specimen is measured using an SCM in FIG. 5, it is possible to measure the location of impurity included in the specimen using another kind of the SPM.

Figure 6:
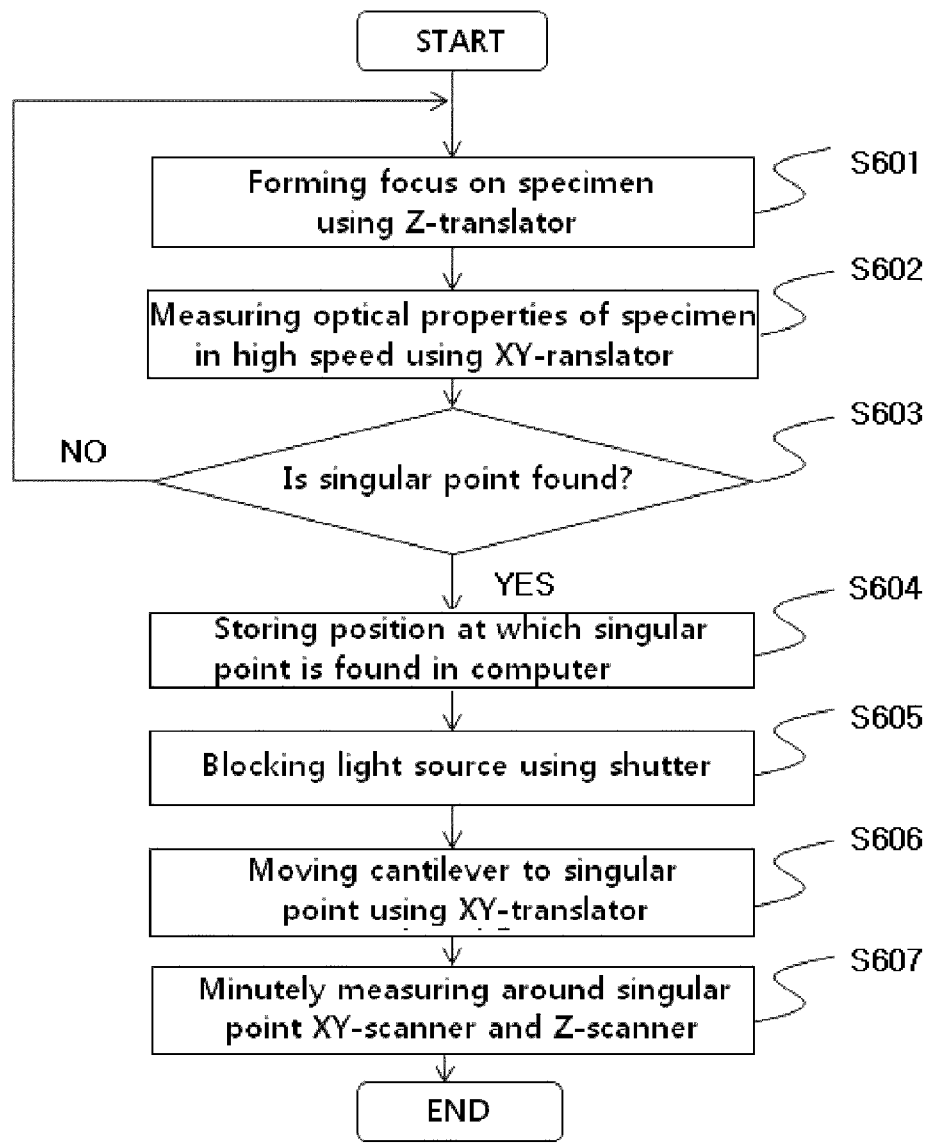
FIG. 6 is a flowchart illustrating a method of measuring optical properties of the specimen using the minute measuring instrument for high speed and large area according to an embodiment of the present invention.

FIG. 6 is a flowchart illustrating a method of measuring optical properties of the specimen using the minute measuring instrument for high speed and large area according to an embodiment of the present invention. Hereinafter, the flow of the method of the present invention will be described with reference to the components in FIG. 1.

At first, a focus is formed on the specimen 300 using a Z-translator 110 (S601). The focus may be formed in dotted or linear shape. Next, the optical properties of the specimen 300 are measured in high speed using the ellipsometer 120 and the XY-translator 240 (S602).

If the singular point is not found from the result of the measurement (NO of S603), the measurement is performed on another portion of the specimen or another specimen using the ellipsometer 120 and the XY-translator 240.

If the singular point is found from the result of the measurement (YES of S603), the information of the location at which the singular point is found is stored in the computer (S604). Next, the light source is blocked using a shutter (S605) and the cantilever 220 is brought to a vicinity of the singular point by moving the specimen 300 using the XY-translator 240 (S606). After that, the measurement is performed on the vicinity of the singular point using the XY-scanner 230 and/or the Z-scanner 210 (S607).

Those skilled in the art will appreciate that the concepts and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

INDUSTRIAL APPLICABILITY

According to the present invention, it is possible to quickly and minutely measure optical singular point of a specimen by measuring properties of a specimen in high speed by a focused-beam ellipsometric part and then minutely remeasuring the position showing a singular point by a minute measuring part.

Also, it is possible to quickly and minutely measure optical properties of a plurality of the specimen by providing an instrument which focuses a light onto the specimen using a convex lens as well as an instrument which focuses a light onto the specimen using a cylindrical optical system in order to measure the optical properties of the specimen in high speed.

The invention claimed is:

1. A minute measuring instrument for high speed and large area, comprising:
 a focused-beam ellipsometric part which is positioned above a specimen, includes a Z-translator and an ellipsometer, and measures optical properties of the specimen at higher speed by focusing polarized light outputted from the ellipsometer onto the specimen and detecting light reflected from the specimen, thereby detecting a singular optical point on a surface of the specimen, wherein the ellipsometer is moved upward or downward by using the Z-translator to focus the polarized light; and
 a minute measuring part which is positioned above the specimen, includes a Scanning Probe Microscope having a Z-scanner, a probe, an XY-scanner, and an XY-translator, and measures a position in a vicinity of the singular optical point at an atom level, wherein the probe is spaced apart from the focused-beam ellipsometric part by a predetermined distance in a horizontal direction and the specimen is moved in the horizontal direction by the XY-translator when the singular optical point is detected.

2. The minute measuring instrument for high speed and large area as set forth in claim 1, wherein the focused-beam ellipsometric part includes
 a beam splitting part for splitting a light generated in a light source into the polarized light;
 a focusing part for focusing the light split by the beam splitting part onto the specimen; and
 a photodetection part for detecting light passed through the focusing part and the beam splitting part after reflected from the specimen.

3. The minute measuring instrument for high speed and large area as set forth in claim 2, wherein the focusing part includes a lens system for focusing the light split by the beam splitting part onto the specimen.

4. The minute measuring instrument for high speed and large area as set forth in claim 2, wherein the focusing part includes a cylindrical optical system for linearly focusing the light split by the beam splitting part onto the specimen.

5. The minute measuring instrument for high speed and large area as set forth in claim 4, wherein the cylindrical optical system includes at least one of semi-cylindrical lens, a semi-cylindrical mirror and a curved mirror.

6. The minute measuring instrument for high speed and large area as set forth in claim 1, wherein the Scanning Probe Microscope measures irregularity in nano-patterns of the specimen or the position of an imperfection included in the specimen.

7. A minute measuring method for high speed and large area using a minute measuring instrument for high speed and large area as set forth in claim 1, the minute measuring method comprising:
 measuring the optical properties of the specimen at the higher speed by focusing the polarized light onto the specimen and detecting the light reflected from the specimen, thereby detecting the singular optical point on the surface of the specimen;
 removing a source light; and
 measuring the position in the vicinity of the singular optical point at the atom level using the Scanning Probe Microscope.

8. The minute measuring method for high speed and large area as set forth in claim 7, wherein the method further comprises:
 storing a position, at which the singular optical point is detected, in a computer.

9. The minute measuring method for high speed and large area as set forth in claim 7, wherein the measuring the position includes:
 placing the probe in the vicinity of the singular optical point using the XY-translator that moves the specimen horizontally; and
 measuring optical properties of the position in the vicinity of the singular optical point using the XY-scanner and the Z-scanner of the Scanning Probe Microscope.

* * * * *